(12) United States Patent
Keller, Jr.

(10) Patent No.: US 7,405,530 B2
(45) Date of Patent: Jul. 29, 2008

(54) METHOD AND APPARATUS FOR AUTOMATICALLY ESTABLISHING CONTROL VALUES FOR A CONTROL DEVICE

(75) Inventor: Robert R. Keller, Jr., Park Ridge, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 515 days.

(21) Appl. No.: 09/997,892

(22) Filed: Nov. 30, 2001

(65) Prior Publication Data
US 2003/0102837 A1    Jun. 5, 2003

(51) Int. Cl.
*H02P 3/00*    (2006.01)
(52) U.S. Cl. .................. 318/466; 318/266; 318/282; 318/471
(58) Field of Classification Search .......... 318/280, 318/283, 286, 266, 445, 466, 560
See application file for complete search history.

(56) References Cited

U.S. PATENT DOCUMENTS

| | | | |
|---|---|---|---|
| 4,394,607 A | 7/1983 | Lemirande | |
| 4,625,291 A | 11/1986 | Hormann | |
| 4,638,433 A | 1/1987 | Schindler | |
| 4,673,848 A * | 6/1987 | Hagiwara et al. | 318/266 |
| 4,831,509 A | 5/1989 | Jones et al. | |
| 4,855,653 A | 8/1989 | Lemirande | |
| 5,278,480 A * | 1/1994 | Murray | 318/626 |
| 5,453,736 A * | 9/1995 | Noren | 340/5.6 |
| 5,682,090 A * | 10/1997 | Shigematsu et al. | 318/468 |
| 5,982,124 A * | 11/1999 | Wang | 318/466 |
| 5,986,421 A * | 11/1999 | Fukazawa et al. | 318/466 |
| 5,994,858 A * | 11/1999 | Miura | 318/283 |
| 6,081,203 A * | 6/2000 | Fitzgibbon | 340/852.72 |
| 6,097,166 A * | 8/2000 | Fitzgibbon et al. | 318/471 |
| 6,107,765 A * | 8/2000 | Fitzgibbon et al. | 318/266 |
| 6,111,374 A * | 8/2000 | Fitzgibbon et al. | 318/282 |
| 6,133,703 A | 10/2000 | Fitzgibbon et al. | |
| 6,150,784 A * | 11/2000 | Nagaoka | 318/467 |
| 6,172,475 B1 * | 1/2001 | Fitzgibbon et al. | 318/266 |
| 6,310,451 B1 * | 10/2001 | Fitzgibbon et al. | 318/266 |
| 6,340,872 B1 * | 1/2002 | Fitzgibbon et al. | 318/9 |
| 6,400,112 B1 | 6/2002 | Fitzgibbon et al. | |
| 6,426,604 B1 * | 7/2002 | Ito et al. | 318/466 |
| 6,528,961 B1 * | 3/2003 | Fitzgibbon et al. | 318/283 |
| 6,799,140 B2 * | 9/2004 | Bernard et al. | 702/151 |
| 6,806,665 B2 * | 10/2004 | Fitzgibbon et al. | 318/282 |
| 2001/0029437 A1 | 10/2001 | Bernard | |

OTHER PUBLICATIONS

U.K. Search Report for GB patent application GB 0227690.5 completed on May 22, 2003.

* cited by examiner

*Primary Examiner*—Paul Ip
(74) *Attorney, Agent, or Firm*—Fitch, Even, Tabin & Flannery (57) ABSTRACT

A movable barrier controller 41 has a force control 44 having a corresponding setting range. As operating conditions change, the barrier controller 41 can execute a learning mode 51. During this mode, the barrier controller 41 operates the barrier movement motor 42 and measures 53 at least one parameter that corresponds to operation of the motor 42. This measured parameter is used to determine 54 a control value which control value is then assigned 55 to a specific location within the setting range of the force control 44.

42 Claims, 4 Drawing Sheets

METHOD AND APPARATUS FOR AUTOMATICALLY ESTABLISHING CONTROL VALUES FOR A CONTROL DEVICE

TECHNICAL FIELD

This invention relates generally to control devices and more particularly to force controls as used with barrier controllers.

BACKGROUND

Movable barrier controllers are known in the art. Such devices typically respond to an actuation signal by actuating a motor and causing a movable barrier to move (the movable barrier can be, for example, a garage door, a date, a shutter, and the like). These devices have become increasingly sophisticated. For example, such controllers are often able to sense resistance to barrier movement. Such information can be used in a variety of ways, including automatically reversing movement of the barrier upon detecting an obstacle in the moving barrier's path. Unfortunately, a universal setpoint does not exist that will work for all barrier controllers systems to facilitate, under all operating conditions, utterly reliable obstacle detection with zero false positives all the time. Consequently, many barrier controllers include a force control that can be adjusted for an individual controller in a particular setting to better ensure safe, reliable, and effective operation.

Figure 1:
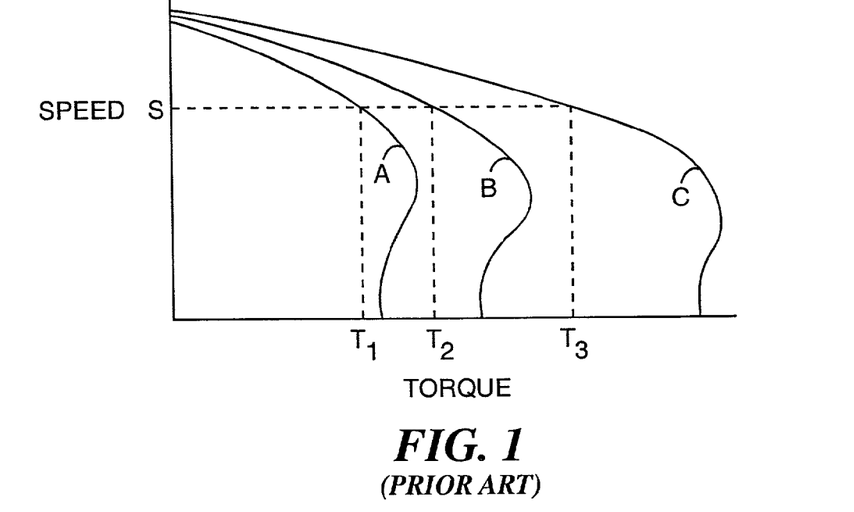
FIG. 1 comprises a prior art depiction of torque/speed curves for three motors.

Over the course of time, operating conditions for a given barrier controller can change. The barrier itself can be modified or exchanged for a different barrier. The barrier movement track can be altered (to obtain hoped-for improvement and/or through accident and mishap). The drive mechanism can also undergo change over time. For example, the motor and/or associated gear ratio can be changed (this often occurs in the context of maintenance and repair). Such changes can significantly impact the efficacy of previous force control settings. For example, consider FIG. 1. Torque/speed curves are depicted for three motors A, B, and C. For a given speed S, motor A has a corresponding torque T1, motor B has a corresponding torque T2, and motor C has a corresponding torque T3. These torques can differ considerably from one another and should ordinarily be taken into account when selecting a force control settings that correspond to a particular speed.

Figure 2:
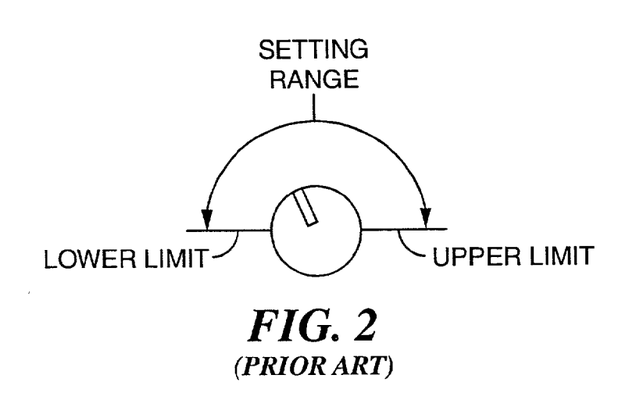
FIG. 2 comprises a generalized depiction of a prior art force control.
Figure 3:
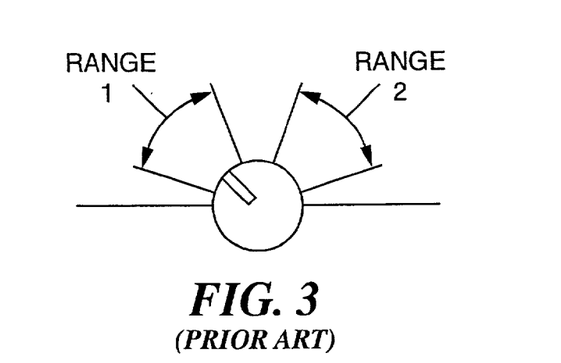
FIG. 3 comprises a generalized depiction of a prior art force control.

Unfortunately, the force control typically comprises a mechanical device having a corresponding mechanical setting range. As depicted in FIG. 2, a typical force control comprises a potentiometer having a user manipulative setting range that is bounded by a lower limit the and an upper limit. Ideally, this setting range should correspond to a useful setting range for a particular barrier controller system. Such correspondence allows for greater useful resolution and granularity of control. For a given set of conditions (including a known motor and gear ratio) such a setting range is achievable. As noted above, however, operating conditions often change over the useful life of a given barrier controller system. By changing motors, as noted above, torque at a given speed can change considerably. This change can make an existing user manipulative setting range of force control values as established for a first set of conditions quite inappropriate for a later set of conditions. For example, with reference to FIG. 3, a prior art force control as designed to accommodate a variety of operating circumstances (including different motors and gear ratios) may have a relatively small useful range of settings for a first motor (as depicted by range 1) and a similar relatively small useful range of settings for a second motor (as depicted by range 2).

A need therefore exists for a way to better accommodate subsequent operating system changes while providing an acceptable range of sensitivity control. Preferably, this need should be met in an economical and ergonomically sensitive manner. Further, minimized user responsibility to ensure such accommodation would be beneficial. Any such solution should also be relatively flexible and able to accommodate a relatively broad range of altered circumstances.

BRIEF DESCRIPTION OF THE DRAWINGS

These needs and others are substantially met through provision of the method and apparatus for automatically establishing control values for a control device as disclosed herein. This benefit and others will become more clear upon making a thorough review and study of the following description, and particularly when taken in conjunction with the drawings, wherein.

DETAILED DESCRIPTION

Generally speaking, upon entering a learning mode, a device is automatically operated and at least one parameter that corresponds to operation of the device is automatically measured. That measured parameter is then used to establish a specific control value and that specific control value is then automatically assigned to a specific location within the mechanical setting range of a corresponding control device. For example, upon initiating this learning mode, a barrier controller can operate its motor and measure at least one parameter that corresponds to operation of the motor. This measured parameter value is used to establish a specific force control value that is then assigned to a specific location within the user manipulative setting range for a force control.

So configured, the setting range for a force control can be substantially optimized for a given set of operating conditions (including motor and gear ratio selection) as may occur over the installed life of the corresponding barrier controller system. This setting range optimization occurs substantially automatically.

Figure 4:
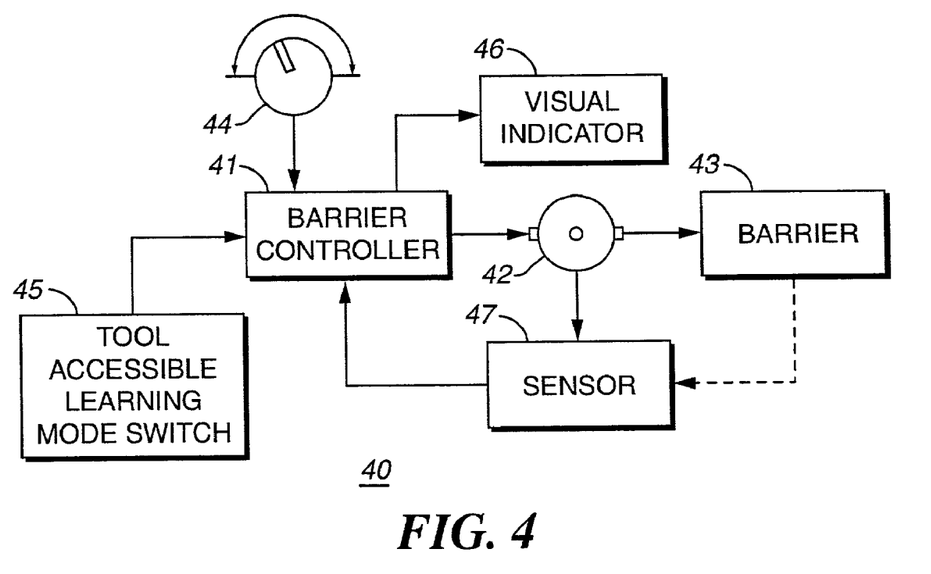
FIG. 4 comprises a block diagram depiction of a barrier controller system configured in accordance with an embodiment of the invention.

Referring now to FIG. 4, a barrier controller system 40 as configured in accordance with an embodiment of the invention includes a barrier controller 41. Barrier controllers are well understood in the art and typically include a microprocessor or other computational platform that can be readily programmed in accordance with the teachings presented below. The system 40 further includes a motor 42 that is controlled by the barrier controller 41 and that is appropriately coupled to a movable barrier 43 to effect movement of the barrier 43 between open and closed positions, all as well understood in the art. A sensor 47, such as a Hall effect sensor, is positioned to sense a parameter that corresponds to operation of the motor 42. For example, the sensor 47 can be positioned to sense rotation of one or more magnets as are affixed to a gear, axle, or other surface that rotates as a function of the motor's 42 operation. In addition, or in the alternative, the sensor 47 can be positioned to sense direct movement of the barrier 43. Other sensor types and locations can be utilized as well so long as the sensor 47 can sense and respond to at least one parameter that corresponds to operation of the motor 42. The system 40 also includes a force control 44 such as a potentiometer that is operably coupled to the barrier controller 41 to provide a force sensitivity input that the barrier controller 41 utilizes, at a minimum, to establish obstacle detection and automatic reversing operation. A tool accessible learning mode switch 45 is also provided to place the barrier controller 41 in a learning mode as described below. The learning mode switch 45 can itself be a simple pushbutton that is manipulable by a user's finger, in which case access to the pushbutton should require a tool such as a screwdriver or other handheld implement. Other approaches are acceptable as well, including a switch that is recessed within a housing for the barrier controller 41 and that is screwdriver actuated by a screwdriver shaft that is inserted through a small hole in the housing as provided therefore. Lastly, a visual indicator 46 such as one or more light emitting diodes or other display platform is operably coupled to the barrier controller 41 to effect visual notifications in accordance with the teachings set forth below.

All of the above components are well understood in the prior art. Therefore, for the sake of brevity and clarity of explanation, additional elaboration will not be presented here.

Figure 5:
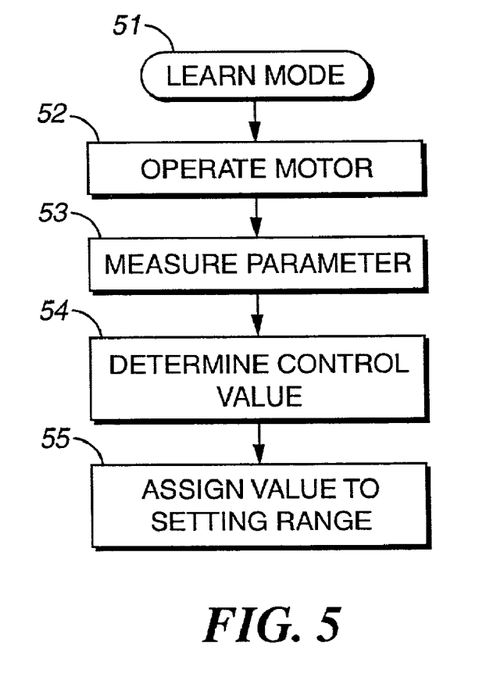
FIG. 5 comprises a flow diagram configured in accordance with an embodiment of the invention.

Referring now to FIG. 5, in accordance with one embodiment of the invention, the barrier controller 41 is programmed such that upon entering 51 a learning mode the barrier controller 41 will operate 52 the motor 42. The barrier controller 41 will then utilize the sensor 47 to measure 53 at least one parameter that corresponds to operation of the motor 42 to provide a parameter value. This parameter value is used to determine 54 a specific force control value, which value is then assigned 55 to a specific location of the user manipulable setting range for the force control 44.

Figure 6:
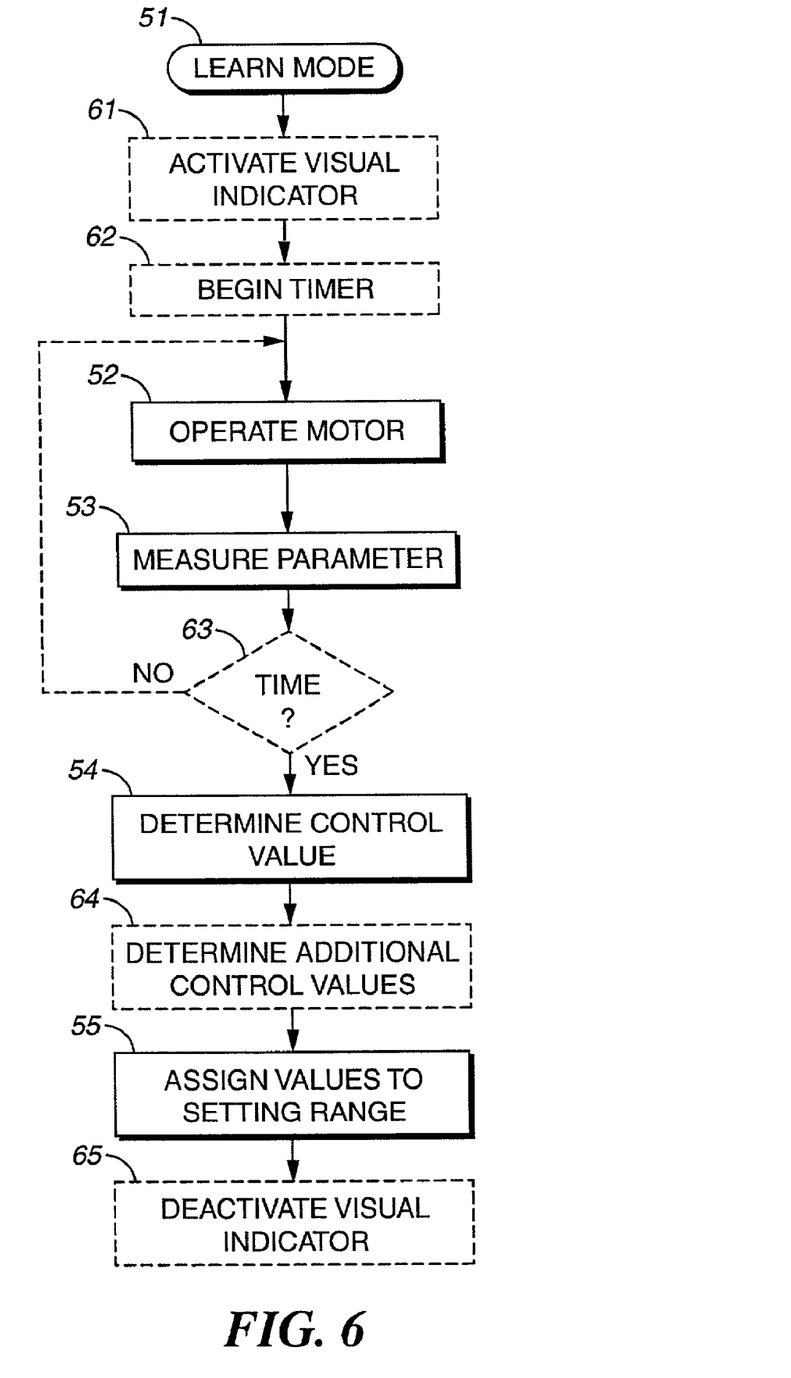
FIG. 6 comprises a detailed flow diagram configured in accordance with various embodiments of the invention.

Referring now to FIG. 6 additional detail and alternative embodiments will be presented. A user enters the learning mode 51 by actuating a user manipulable learning mode initiation switch such as the tool accessible learning mode switch 45. In one embodiment, a single assertion of this switch 45 will initiate the learning mode 51. If desired, and pursuant to an alternative embodiment, the learning mode 51 can only be initiated and/or maintained by asserting the switch 45 for either at least a predetermined period of time (such as, for example, five consecutive seconds) or for the entire duration of the learning cycle. If desired, a visual indicator can optionally be activated 61 to indicate to the user that the learning mode 51 has been initiated and/or is presently active. This visual indication can be provided by the visual indicator 46 described above.

Pursuant to one embodiment, the learning mode 51 will operate for a predetermined period of time. One way of achieving this is to optionally began 62 a timer. Such a timing function can be provided by a dedicated timer that provides timing information within and/or to the barrier controller 41 or by a software implemented timing function within the computational platform of the barrier controller 41, all in accordance with well understood prior art technique. In one embodiment, the learning mode 51 can be rendered active for 30 seconds.

The barrier controller 41 then operates 52 the motor 42. In one embodiment, the motor 42 is operated 52 in a substantially unloaded operating state. Operating 52 the motor 42 in this state will provide a reliable indication of the highest speed that the motor 42 is likely capable of. In another embodiment, the motor 42 is operated 52 in an ordinary loaded operating state. Operating 52 the motor 42 in this state will provide a reliable indication of the highest speed that the motor 42 is likely capable of under ordinary operating conditions. If desired, and as may be appropriate to a particular application, the motor 42 could be operated 52 under some other known predetermined operating condition, such as by operating the motor 42 while coupled to a specific known weight.

The barrier controller 41 then measures 53 a parameter that corresponds to operation of the motor 42. For example, using the sensor 47, measurement can be taken of a parameter that corresponds to speed of rotation of the motor's drive axle. This can be achieved, for example, by directly measuring speed of rotation of the drive axle, or by measuring speed of rotation of a rotating member that has a speed of rotation that varies with respect to speed of rotation of the drive axle of the motor 42 as a function of, for example, a gear ratio or pulley ratio. In addition, or in the alternative, such a parameter can be obtained by measuring a parameter that corresponds to speed of movement of the barrier 43 itself as the motor 42 operates. As well understood in the art, such a sensor 47 will provide electric pulses that corresponds to the sensed parameter. For example, if a gear plate has two magnets disposed on the plate and opposite from one another, two such electric pulses per revolution of the gear plate will be provided by the sensor 47. Pursuant to one embodiment, two consecutive pulses can be utilized to obtain a parameter value that corresponds to speed of rotation of the drive axle of the motor 42. In another embodiment, such pulses can be counted over a predetermined period of time to obtain an average number of pulses per window of time. This average number can be utilized as the parameter value that corresponds to speed of rotation of the drive axle of the motor 42. By measuring such a parameter, the parameter can be seen to correspond to the rotational output of the motor 42, and hence the speed of the motor 42.

Following measurement 53 of the parameter, if the learning mode is being conducted over a predetermined period of time, the running time can be checked 63. If time remains, the process can continue with motor operation 52 and parameter measurement 53 (in this way an average for the parameter can be established as appropriate to a corresponding embodiment). Otherwise, the barrier controller 41 determines 54 a specific force control value while using the parameter value. For example, in one embodiment, the barrier controller 41 can assign the previously determined parameter value as the specific force control value. As an example of the latter, if the parameter value were "1600" as measured over a 32nd operating period and if this parameter value reflected sensor 47 output wherein one electrical pulses was provided per motor axle revolution, then the parameter value of "1600" could be used to assign a corresponding value as the force control value. In another embodiment, the barrier controller 41 can assign a modified version of the previously determined parameter value as the specific force control value. As an example of the latter, if the parameter value were "3200" as measured over a one minute operating period and if this parameter value reflected sensor 47 output wherein two electrical pulses are provided per motor axle revolution, then the parameter value could be divided by two to obtain a specific force control value of "1600" (which value would correspond to 1600 rpm).

If desired, additional control values can optionally be determined 64 as well. For example, the previously determined force control value can be utilized to calculate a maximum force control value. In one embodiment, such a maximum force control value can be calculated by decreasing the previously determined force control value by a predetermined amount such as, for example, 10 percent. In such an embodiment, a previously determined force control value of "1600" would yield a calculated maximum force control value of "1440." In the alternative, the previously determined force control value could be increased or decreased as appropriate by a specific amount or through consideration of other stored or measured parameters to calculate the maximum force control value. In another embodiment, rather than calculating the maximum force control value directly, a lookup table could be utilized to correlate the previously determined force control value (or a modified version thereof) to a predetermined maximum force control value. In addition to determining a maximum force control value, the previously determined force control value could also be utilized to calculate or otherwise determine other control values as well. In the alternative, if desired, additional control values can simply be determined 64 by using previously stored control values, including a previously stored maximum force control value, either alone or in conjunction with the previously determined force control value.

Figure 7:
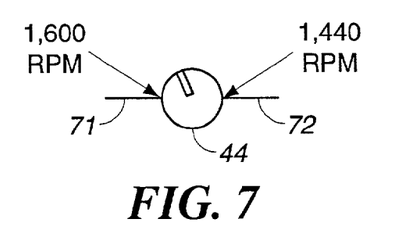
FIGS. 7 through 11 comprise generalized depictions of force controls that illustrate various aspects and embodiments as configured in accordance with the invention.

Once the specific control value(s) are determined, it or they are assigned 55 to specific positions within the setting range of the force control 44. There are of variety of ways by which this can be done. In one embodiment, the initially determined control value is assigned to one of the limits of the force control 44 and most typically is assigned to the lower limit of the setting range. For example, with reference to FIG. 7 a previously determined force control value of "1600" can be assigned to the lower limit 71 of the force control 44. A maximum force control value as optionally previously determined 64 would be assigned to the upper limit 72 for the force control 44. In the example depicted, the maximum force control value was calculated by decreasing the lower limit amount by 10 percent, yielding "1440" as the maximum force control value.

Figure 8:
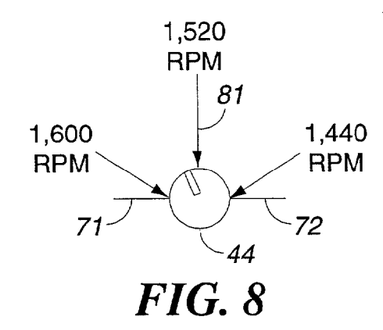
Figure 9:
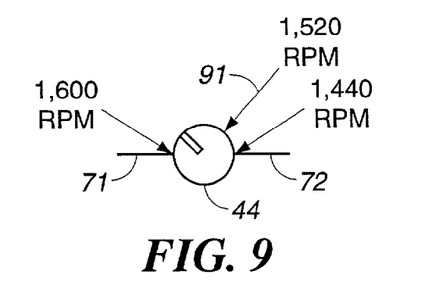

Referring now to FIG. 8, remaining values can be assigned (or later interpolated) in a linear distribution between the lower limit 71 and the upper limit 72. In such an embodiment, as depicted, this would result in a midway value 81 of "1520" (presuming again for purposes of this example that the lower limit 71 is "1600" and the upper limit 72 is "1440"). If desired, however, the intermediate values can be assigned in a nonlinear distribution instead of a linear distribution. For example, and with reference to FIG. 9, the midway value "1520" can be assigned to a non-midway physical location 91 within the setting range of the force control 44. As depicted, this midway value has been assigned to a physical location 91 that is closer to the upper limit 72 than to the lower limit 71. Such a positioning would likely increase the granularity and resolution of sensitivity when selecting a control value between the lower limit 71 and the non-midway physical location 91 of the midway value while simultaneously reducing granularity and resolution of sensitivity when selecting a control value positioned more proximal to the upper limit 72.

Figure 10:
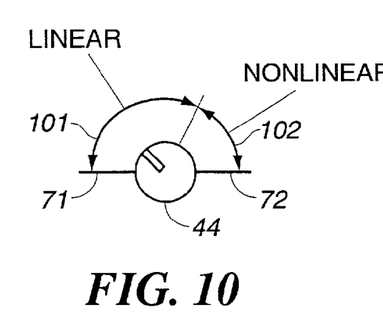
Figure 11:
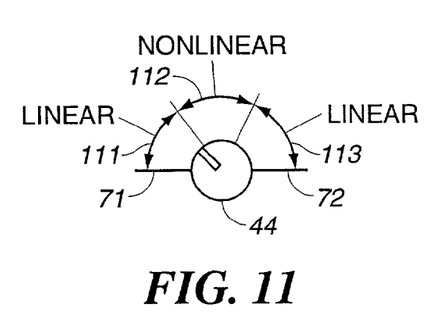

Other assignment possibilities also exist. For example, FIG. 10 depicts a force control 44 having a setting range where control values in a first portion 101 of the setting range are distributed in a linear fashion and where control values in a second portion 102 of the setting range are distributed in a nonlinear fashion. As another example, FIG. 11 depicts a force control 44 having a setting range where control values in two portions 111 and 113 of the setting range are distributed in a linear manner and where control values in another portion 112 of the setting range are distributed in a nonlinear fashion. Implementation decisions regarding use of linear, nonlinear, or linear/nonlinear distribution patterns can be made apriori or dynamically at the time of assigning 55 such values to the setting range as appropriate to the application and/or flexibility required.

The assignment of such values to the setting range of the force control 44 can be effected in various ways. For example, when the force control 44 comprises a potentiometer, the biasing voltage for that potentiometer can be varied to reflect the assigned control values. For example, if the presently applied bias voltage is 4 volts and if the barrier control or 41 is programmed to interpret 5 volts as 1440 and if the value to be assigned to the upper limit 72 is 1440, then altering the bias voltage from 4 volts to 5 volts will result in effectively assigning the control value "1440" to the upper limit 72 of the force control 44. Pursuant to another embodiment, the bias voltage can remain constant such that the force control 44 provides effectively never changing electric signals for each physical location within the setting range. In this case, the barrier controller 41 is itself modified to map (or calculate) those electric signals to the appropriate control value as assigned 55 during the learn mode 51.

If a visual indicator had been activated 61 at the initiation of the learn mode 51, then that visual indicator can be deactivated 65 at the conclusion of the learn mode 51.

Figure 12:
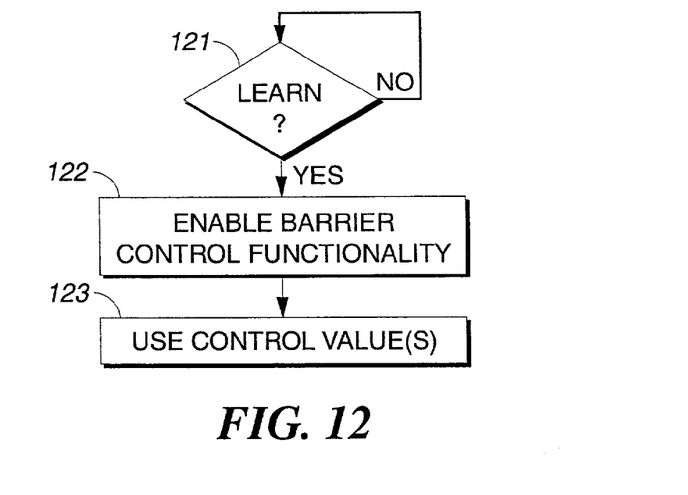
FIG. 12 comprises a flow diagram configured in accordance with an embodiment of the invention.

When newly installing a barrier controller system 40, it may be desired to require that the learn mode 51 be processed prior to allowing normal functionality of the system 40. In this case, one or more functions of the system 40 can be disabled until the learn mode 51 has been processed. With reference to FIG. 12, the barrier controller 41 can determine 121 whether the learn mode has been used. When eventually this determination 121 determines that the learning mode 51 has been processed and concluded, the barrier controller 41 can enable 122 other barrier control functionality to thereby facilitate normal use of the system 40. The control values as determined 54 and assigned 55 during the learn mode 51 are thereafter used 123 to correlate a particular user manipulated setting to a particular operational force control value as described above.

So configured, the operating conditions for any given barrier controller can be significantly altered over time. This includes the changing of motors and gear ratios. Notwithstanding such changes, upon initiation of the learn mode 51, the barrier controller 41 can automatically ascertain one or more values to be assigned to the setting range of the force control 44 for that barrier controller. In particular, control values for the entire setting range can be selected to ensure that the setting range largely or wholly contains control values that are relevant and appropriate for the new operating conditions. This greatly enhances the ease of and likelihood that the operation of the barrier controller 41 will be appropriately adjusted to ensure both safe and appropriate performance.

Those skilled in the art will recognize that various alterations, modifications, and combinations can be made with respect to the various embodiments described above. Such alterations, modifications, and combinations are not to be viewed as being outside the appropriate scope of the invention.

I claim:

1. A method for use with a barrier controller having a physical user interface manipulable by a user through a corresponding physical setting range having a first physical position corresponding to a first end, a second physical position corresponding to a second end, and at least one specific intermediate physical position between the first physical position and the second physical position, comprising:
    initiating a learning mode;
    operating a motor;
    measuring at least one parameter that corresponds to operation of the motor to provide a parameter value;
    using the parameter value to establish a specific force control value;
    assigning, during the learning mode, the specific force control value to a specific physical position of the physical user interface, the position being within the physical setting range for the physical user interface.

2. The method of claim 1 and further comprising: concluding the learning mode; and using the specific force control value to correlate a particular user manipulated setting to a particular operational force control value.

3. The method of claim 1 and further comprising: assigning a maximum force control value to the second end of the physical setting range for the force control.

4. The method of claim 3 wherein assigning a maximum force control value to the second end of the physical setting range for the force control includes using the specific force control value to calculate the maximum force control value.

5. The method of claim 3 wherein assigning a maximum force control value to the second end of the physical setting range for the force control includes using a previously stored maximum force control value.

6. The method of claim 3 wherein assigning a maximum force control value to the second end of the physical setting range for the force control includes using the specific force control value and other previously stored sensitivity control's values to identify the maximum force control value.

7. The method of claim 1 and further comprising disabling at least some barrier controller functions until the learning mode has been initiated at least one time.

8. The method of claim 1 and further comprising enabling at least one barrier control function upon concluding the learning mode.

9. The method of claim 1 and wherein initiating the learning mode includes actuating a user manipulable learning mode initiation switch.

10. The method of claim 9 wherein actuating the user manipulable learning mode initiation switch includes using a tool to access the user manipulable learning mode initiation switch.

11. The method of claim 1 wherein operating the motor includes operating the motor in a substantially unloaded operating state.

12. The method of claim 1 wherein operating the motor includes operating the motor in an ordinary loaded operating state.

13. The method of claim 1 wherein measuring at least one parameter that corresponds to operation of the motor includes measuring a parameter that corresponds to speed of rotation of a drive axle of the motor.

14. The method of claim 13 wherein measuring a parameter that corresponds to speed of rotation of a drive axle of the motor includes measuring speed of rotation of the drive axle of the motor.

15. The method of claim 13 wherein measuring a parameter that corresponds to speed of rotation of a drive axle of the motor includes measuring speed of rotation of a rotating member that has a speed of rotation that varies with respect to speed of rotation of the drive axle of the motor as a function of a gear ratio.

16. The method of claim 1 wherein measuring at least one parameter that corresponds to operation of the motor includes measuring a parameter that corresponds to speed of movement of a barrier that is operably coupled to the motor.

17. The method of claim 1 and further comprising providing a visual signal to indicate initiation of the learning mode.

18. The method of claim 1 wherein measuring at least one parameter that corresponds to operation of the motor to provide a parameter value includes sensing electric pulses that correspond to operation of the motor.

19. The method of claim 18 wherein measuring at least one parameter that corresponds to operation of the motor to provide a parameter value further includes counting the electric pulses over a predetermined period of time to obtain an average number of pulses per window of time.

20. The method of claim 1 wherein using the parameter value to establish a specific force control value includes assigning the parameter value as the specific force control value.

21. The method of claim 1 wherein using the parameter value to establish a specific force control value includes modifying the parameter value in a predetermined way to provide a modified parameter value and assigning the modified parameter value as the specific force control value.

22. The method of claim 1 and further comprising assigning other force control values to settings of the at least one specific intermediate position of the physical setting range for the force control.

23. The method of claim 22 wherein assigning other force control values to settings of the at least one specific intermediate position of the physical setting range for the force control includes assigning the force control values to thereby establish a linear relationship between the assigned force control values with respect to the settings of the at least one specific intermediate position of the physical setting range.

24. The method of claim 22 wherein assigning other force control values to settings of the at least one specific intermediate position of the physical setting range for the force control includes assigning the force control values to thereby establish a non-linear relationship between the assigned force control values with respect to the settings of the at least one specific intermediate position of the physical setting range.

25. The method of claim 1 wherein assigning the specific force control value to a specific location of the physical setting range for the force control includes assigning the specific force control value to the first end of the physical setting range for the force control.

26. The method of claim 25 and further comprising assigning a maximum force control value to the second end of the physical setting range for the force control.

27. The method of claim 25 and further comprising using the specific force control value to calculate a maximum force control value.

28. The method of claim 27 wherein using the specific force control value to calculate a maximum force control value includes adding to the specific force control value and amount substantially equal to 10 percent of the specific force control value.

29. The method of claim 27 and further comprising assigning the maximum force control value to the second end of the physical setting range for the force control.

30. A method for use with a movable object having a user manipulable force control that has a physical user interface manipulable by a user through a corresponding mechanical setting range having a first physical position corresponding to a lower limit, a second physical position corresponding to an upper limit, and at least one specific intermediate physical position between the first physical position and the second physical position, comprising:

initiating a learning mode;

automatically operating a motor for at least a predetermined period of time;

measuring at least one parameter that corresponds to operation of the motor to provide a parameter value;

using the parameter value to establish a specific force control value;

assigning, during the learning mode, the specific force control value to a specific physical position of the physical user interface, the position being within the mechanical setting range for the physical user interface.

31. The method of claim 30 wherein automatically operating a motor includes automatically operating the motor under predetermined operating conditions.

32. The method of claim 31 wherein automatically operating the motor under predetermined operating conditions includes automatically operating the motor under one of: a substantially unloaded operating condition; and an ordinarily loaded operating condition.

33. The method of claim 30 wherein measuring at least one parameter that corresponds to operation of the motor includes measuring at least one parameter that corresponds to rotational output of the motor.

34. The method of claim 30 wherein assigning the specific force control value to a specific location of the mechanical setting range for the force control includes assigning the specific force control value to the lower limit of the mechanical setting range for the force control.

35. The method of claim 30 and further comprising using the specific force control value to identify other force control values.

36. The method of claim 35 and further comprising assigning at least some of the other force control values to specific intermediate locations of the mechanical setting range for the force control.

37. A method for use with a barrier controller having a physical user interface manipulable by a user through a corresponding physical setting range having a first physical position corresponding to a first end, a second physical position corresponding to a second end, and at least one specific intermediate physical position between the first physical position and the second physical position, comprising:

initiating a learning mode;

automatically operating a device in response to initiating the learning mode;

automatically measuring at least one parameter that corresponds to operation of the device to provide a parameter value;

automatically using the parameter value to establish a specific control value;

automatically assigning, during the learning mode, the specific control value to a specific physical position of the physical user interface, the position being within the physical setting range for the physical user interface;

concluding the learning mode.

38. A barrier controller for use with a movable barrier, a motor operably coupled to move the movable barrier in response to commands from the barrier controller, and a sensor for sensing at least one parameter that corresponds to operation of the motor, the barrier controller having a physical user interface manipulable by a user through a corresponding physical setting range having a first physical position corresponding to a first end, a second physical position corresponding to a second end, and at least one specific intermediate physical position between the first physical position and the second physical position, the barrier controller comprising:

a force control having the physical setting range; and a programmable controller that is programmed to:

operate the motor during a learning mode;

receive information regarding the at least one parameter from the sensor during the learning mode;

using the information to establish a specific force control value during the learning mode; and         assigning, during the learning mode, the specific force control value to a specific physical position of the physical user interface, the position being within the physical setting range of the physical user interface.

39. The barrier controller of claim 38 wherein the barrier controller further comprises learning mode actuation means for at least initiating the learning mode.

40. A barrier controller for use with a movable barrier, a motor operably coupled to move the movable barrier in response to commands from the barrier controller, and a sensor for sensing at least one parameter that corresponds to operation of the motor, the barrier controller having a physical user interface manipulable by a user through a corresponding physical setting range having first physical position corresponding to a first end, a second physical position corresponding to a second end, and at least one specific intermediate physical position between the first physical position and the second physical position, the barrier controller comprising:

force control means having the physical setting range for providing a signal that corresponds to a force control value;

learning means for initiating a learning mode;

operation means responsive to the learning means and operably coupled to the motor to cause operation of the motor during the learning mode;

measurement means responsive to the sensor for measuring the at least one parameter during the learning mode;

determination means responsive to the measurement means for using at least one measurement of the at least one parameter to establish a specific force control value;

assignment means responsive to the determination means for assigning at least the specific force control value to a specific physical position of the physical user interface, the position being within the physical setting range of the physical user interface.

41. The barrier controller of claim 40 wherein the determination means further determines other force control values.

42. The barrier controller of claim 41 wherein the assignment means further assigns at least some of the other force control values to specific locations of the physical setting range of the force control means.

* * * * *

UNITED STATES PATENT AND TRADEMARK OFFICE
CERTIFICATE OF CORRECTION

PATENT NO.          : 7,405,530 B2
APPLICATION NO. : 09/997892
DATED                  : July 29, 2008
INVENTOR(S)       : Robert R. Keller It is certified that error appears in the above-identified patent and that said Letters Patent is hereby corrected as shown below:

Claim 11, Column 7, Line 53; Change "substantially unloaded" to -- less than fully loaded --;

Claim 28, Column 8, Line 60; Change "and" to -- an --;

Claim 28, Column 8, Line 61; delete "substantially";

Claim 28, Column 8, Line 60; Change "and" to -- an --;

Claim 28, Column 8, Line 60; after "to" insert -- about --;

Claim 32, Column 9, Line 24; Change "substantially unloaded" to -- less than fully loaded --;

Claim 32, Column 9, Lines 24-25; Change "an ordinarily loaded" to -- a more than fully loaded --;

Claim 42, Column 10, Line 60; after "specific" insert -- intermediate --.

Signed and Sealed this

Sixteenth Day of December, 2008

JON W. DUDAS
*Director of the United States Patent and Trademark Office*